United States Patent [19]
Colgate et al.

[11] Patent Number: 4,892,321
[45] Date of Patent: Jan. 9, 1990

[54] ULTRA-HIGH VACUUM DEVICE GASKET WITH MEANS OF INSERTION AND REMOVAL

[76] Inventors: Samuel O. Colgate, 4132 NW. 38 St., Gainesville, Fla. 32606; Grant M. Schrag, 8114 SW. 53rd Pl., Gainesville, Fla. 32608

[21] Appl. No.: 207,533

[22] Filed: Jun. 16, 1988

[51] Int. Cl.[4] ............................................. F16L 19/00
[52] U.S. Cl. .................................. 277/167.5; 277/170
[58] Field of Search ...................... 277/235 B, 236, 170, 277/171, 172, 167.5; 73/861.61; 220/318

[56] References Cited

U.S. PATENT DOCUMENTS

| | | | |
|---|---|---|---|
| 3,208,758 | 9/1965 | Carlson et al. | 277/171 |
| 3,211,478 | 10/1965 | Batzer | 277/236 |
| 3,937,478 | 2/1976 | Mancebo | 277/171 |
| 3,949,787 | 4/1976 | Milo | 220/318 |
| 4,445,694 | 5/1984 | Flaherty | 277/236 |
| 4,616,860 | 10/1986 | Faria et al. | 277/171 |
| 4,750,370 | 6/1988 | Ossyra | 73/861.61 |

Primary Examiner—William A. Cuchlinski, Jr.
Assistant Examiner—Jeff Hohenshell
Attorney, Agent, or Firm—Dennis P. Clarke

[57] ABSTRACT

A gasket seal for use in ultra-high vacuum systems is provided which comprises two rigid flanges disposed in opposite facing relation to each other, the flanges having a gasket inserted therebetween when the gasket seal is made up into its operating position. The gasket has at least one integral handle in the form of at least one wire adapted to extend from the gasket through a leak check groove of one of the flanges, the wire being used to handle the gasket and to clip the gasket to one of the flanges where desired prior to making up the joint. The wire may also be used as a conductor of heat to deliver heat to the portion of the system under vacuum, and the gasket may further have feedthrough means or a section having mounting holes for support structures extending inwardly of the flanges.

24 Claims, 3 Drawing Sheets

ULTRA-HIGH VACUUM DEVICE GASKET WITH MEANS OF INSERTION AND REMOVAL

BACKGROUND OF THE INVENTION

1. Field of the Invention

This invention relates to a gasket seal and more particularly, to a gasket seal for use in ultra-high vacuum devices.

2. Description of the Prior Art

Ultra-high vacuum environments, and devices capable of maintaining an ultra-high vacuum are essential in a number of scientific and commercial settings including surface science studies, space simulation chambers and high energy physics research.

For work at pressures less than $10^{-8}$ torr, it is necessary to bake the entire chamber of an ultra-high vacuum device and all its flanges to several hundred degrees Celsius in order to outgas all of the internal surfaces. Vacuum systems of this type thus require near perfect seals at the contact points of the flanges which are able to withstand the temperature and pressure demands of the system and are able to maintain the seals over a wide range of temperatures and pressures.

A standard flange geometry has been developed under the name CONFLAT. This flange geometry has been adopted as an international industry standard for flanges, and requires a soft-metal gasket to seal the CONFLAT joints, which may be manufactured of copper or aluminum. Examples of such gaskets are described in U.S. Pat. Nos. 4,616,860 and 3,211,478.

Although standard for general use, the CONFLAT system usually requires customization for particular uses. For instance, in order to provide inlets for electricity, refrigerants, motion, gas or light into a vacuum system, hermetically sealed feedthroughs must be used. This is presently accomplished by welding or brazing feedthroughs to a flange or to the wall of a vacuum chamber. If it is desired that a feedthrough be demountable it is usually permanently mounted to a demountable flange. The flange is then sealed to a mating flange on the vacuum chamber using a captured elastomeric O-ring or soft-metal ring gasket.

Although popular because of its ability to maintain seal integrity during high temperature cycling, the use of CONFLATS is not without problems. There are four principal problems associated with the insertion and removal of CONFLAT gaskets. First, the gaskets must be handled with polyethylene or latex gloves to avoid fingerprint contamination of that part of their surfaces which will be inside the vacuum system. The use of such gloves is often awkward and expensive.

Second, frequently the orientation of flanges on the vacuum system makes installation of CONFLAT gaskets difficult. Specifically, gaskets have a tendency to fall out of position (often onto dirty floors) during the installation operation.

Thirdly, many times gaskets will fall out of position during the installation, but will remain between the flanges and out of position for sealing, thus leading to mysterious and difficult to locate leaks.

Finally, quite often during removal of CONFLAT gaskets, it is found that the gasket material has flowed to such an extent that the gasket becomes lodged into one of the CONFLAT joint flanges. The removal of such a lodged gasket is difficult as there is less than 0.040 in. of gasket above the uppermost surface of the sealing face. To use sharp implements to dislodge the gasket is often the only means of gasket removal. Such sharp implements can damage the critical sealing surface of the CONFLAT flange, resulting in leakage.

The fabrication of nearly all structures to be used within ultra-high vacuum chambers centers on the CONFLAT flange. This is especially the case if the structure is to be easily removed from the vacuum environment. There are at present no standard mounting fixtures available to the ultra-high vacuum chamber user. CONFLAT flanges are purchased either blank for later machining by the user, or with a custom-made structure. If one wishes to mount a fixture within the vacuum chamber, it is necessary to provide mounting means by machining the inside surface of the CONFLAT flange. These flanges are made of stainless steel, which is difficult to machine, and the machining process exposes the flanges to environments which are harsh for ultra-high vacuum components. The sealing knife edges of the CONFLAT flange are exposed to chips and sharp tooling, and the entire flange is exposed to oil and dirt from machines and machinist's hands. Unless a high degree of attention is paid to cleanliness during machining, the flange must be thoroughly cleaned by a lengthy and costly process following the machining of a flange in a machine shop.

By providing holes in the CONFLAT gasket which receive supporting structure, such as mounting fixtures, the need for machining the CONFLAT flange may be eliminated in many cases. This is especially important to the user if the structure is to be used only temporarily.

SUMMARY OF THE INVENTION

Accordingly, it is one object of the present invention to provide a gasket seal which is capable of inexpensive replication without resorting to sophisticated handling equipment or special tools.

It is another object of the present invention to provide a means for easily mounting and demounting fixtures within an ultra-high vacuum chamber which can be quickly and easily changed depending on the requirement of a particular application.

It is another object of the present invention to provide the capability of mounting fixtures intended to be used in an ultra-high vacuum chamber prior to insertion by mounting the fixtures outside of the chamber and by inserting the fixtures and gasket together into the chamber and thus avoiding the need to contact any fixture or gasket surfaces which will eventuate within the ultra-high vacuum chamber.

It is still another object of the present invention to provide a gasket for an ultra-high vacuum apparatus also having the capability of cooling or heating within the chamber by means of said gasket.

It is yet another object and distinct advantage of the present invention to provide a means by which a gasket seal can be affected in an ultra-high vacuum apparatus without directly contacting any of the surfaces that will eventuate within the chamber of the ultra-high vacuum apparatus.

It is another significant advantage and a distinct feature of the present invention to provide through holes in the gasket of an ultra-high vacuum chamber which may be used for cooling or heating inside the chamber.

It is another feature of the present invention to provide means for handling of a gasket to be inserted in an ultra-high vacuum chamber device wherein the means for handling remains outside of the vacuum chamber at all times including when the device has been evacuated.

In accordance with these and other objects, advantages and features of the invention, there is provided by the present invention at least two substantially rigid flanges, each having an annular sealing surface, a gasket and gasket seal for an ultra-high vacuum chamber whereby the gasket has a handling means by which the gasket can be inserted into and removed from the flange sealing surfaces, the gasket further having means for mounting fixtures within the chamber and also providing for feedthrough holes through which fluids may be injected so as to heat or cool the objects within the chamber without coming into contact with the contents thereof. The gasket may also be somewhat larger than the opening of the flanges or have extensions protruding into the chamber beyond flange shoulders so that support structure may be attached to the gasket which will eventuate within the vacuum chamber when it is in operation.

These and other objects, features and advantages will become apparent in light of the following detailed description of the invention when understood with particular reference to the drawing figures, in which like referenced numerals indicate like elements of the invention shown in different embodiments.

DETAILED DESCRIPTION OF THE INVENTION

Figure 1:
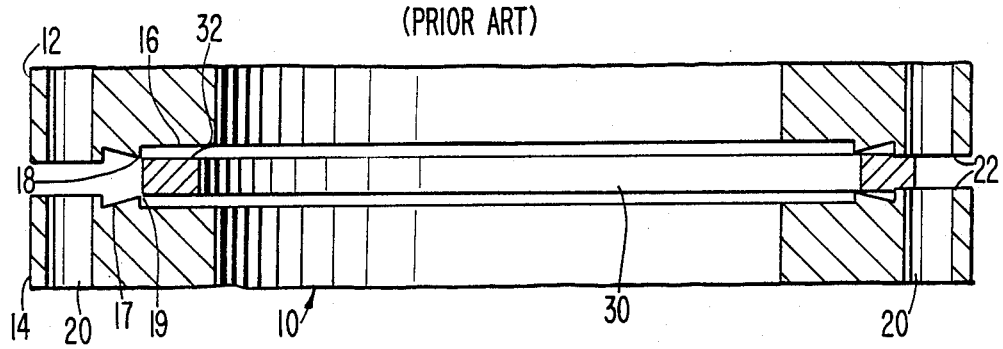
FIG. 1 illustrates a CONFLAT gasket seal of conventional design in a cross-sectional view and shows a leak path resulting from an improperly positioned gasket.

A CONFLAT gasket seal according to the prior art is shown in FIG. 1. Each of the conventional flange members 12, 14 may be used in conjunction with the present application without modifications. Both top flange 12 and bottom flange 14 have a circular opening generally indicated at 10, an annular sealing surface 16 formed in a depression 17 of the flanges 12 and 14, which is disposed around the opening 10, the sealing surface 16 further having a knife edge 18 also disposed completely around the opening 10.

An annular CONFLAT gasket 30 also has sealing surfaces 32 which, in conjunction with the flange sealing surfaces 16 and knife edges 18, form an airtight seal for use with an ultra-high vacuum chamber which may be integral with one of the flanged members 12 or 14. In operation, the CONFLAT gasket 30 is positioned within flange depression 17 so that gasket sealing surfaces 32 are disposed adjacent bottom flange sealing surface 16. Top flange 12 is then positioned over the bottom flange-gasket assembly so that holes 20 of each of the flanges are adjacent (as shown), and the two flanges are then joined together by appropriate joining means (not shown) such as threaded bolts. When the joining means completely tighten so that the joining surfaces 22 are almost touching, knife edge 18 of both flanges should be cutting into the gasket sealing surfaces 32.

Shown in FIG. 1 is one of the drawbacks of the prior art as discussed above. Improper positioning of annular gasket 30 within depression 17 can cause gaps to form in the gasket seal. A gap 19 in the seal results in a stream of air passing through the seal, thus necessitating the removal and replacement of gasket 30 so as to effectuate a complete seal necessary for use in an ultra-high vacuum apparatus.

Other drawbacks, as discussed above, result from the characteristics of the soft metal utilized in the gasket. Copper gaskets are malleable and the tightening of the joining means causes the material to "flow" into depression 17 and between joining surfaces 22, necessitating special tools in order to pry the gasket away from the flanges. Furthermore, occasionally the gasket 30 sticks to top flange 12 when it is removed, and falls out of the depression 17 onto, for instance, a dirty laboratory floor, and requires extensive cleaning with special fluids and the like.

Figure 2:
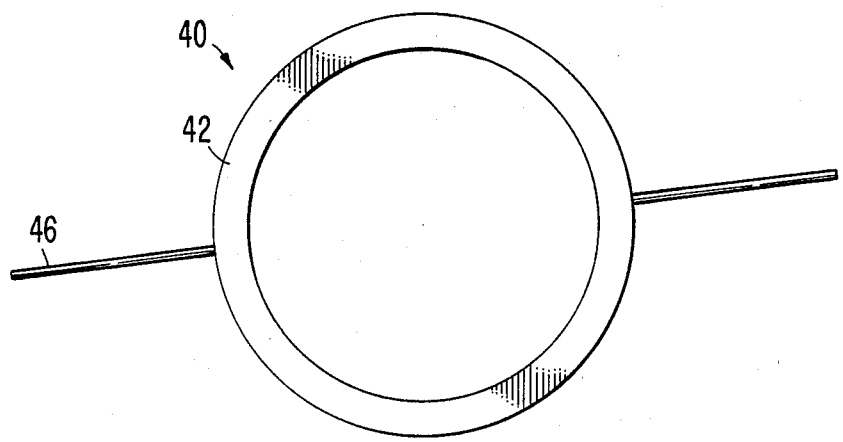
FIG. 2 illustrates a top view of one embodiment of the inventive gasket having handles.

Applicants propose to solve many of the drawbacks of the prior art devices by providing handling means for the gasket 40, as shown in FIG. 2. Gasket 40, having sealing surface 42, is shown in FIG. 2.

Figure 3:
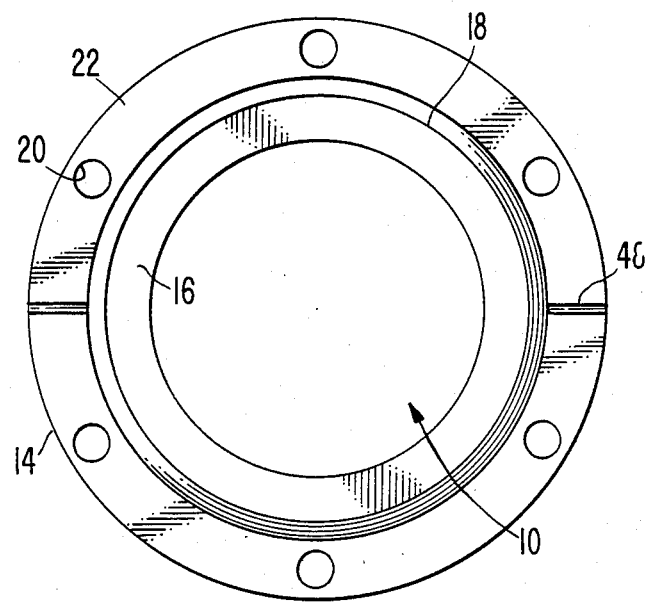
FIG. 3 illustrates a top view of the bottom flange of the gasket seal according to the present invention.

Positioning and orienting means are provided in gasket 40 by handles 46, which in use are positioned in conventional leak check grooves 48 disposed in one or both of the flange members 12 and 14 as shown in FIG. 3. The leak check grooves 48 are typically rectangular and have dimensions equal to or slightly larger than the dimensions of the handles 46 so as to accommodate handles 46 when the seal is in an operating position and still provide sufficient passage for the flow of helium gas to the outside periphery of the gasket during leak checking.

Although two handles 46 are shown in FIG. 2 and two leak check grooves 48 in FIG. 3, any number from 1 to about 10 may be utilized. Two are preferred because of the pressure of two leak check grooves on standard flanges which allow force to be applied to both sides of the gasket 40 when it is necessary to remove it from flange 14. Also, two leak check grooves are utilized in conventional CONFLAT flanges. Thus inventive gasket 40 is compatible with the universally accepted geometry for ultra-high vacuum flanges, i.e. CONFLAT flanges, and it provides for easy handling, insertion and removal of soft-metal, ultra-high vacuum gaskets. The handles 46 also improve the reliability of seal formation by preventing misalignment of the gasket in flange depression 17 during insertion.

Figure 7:
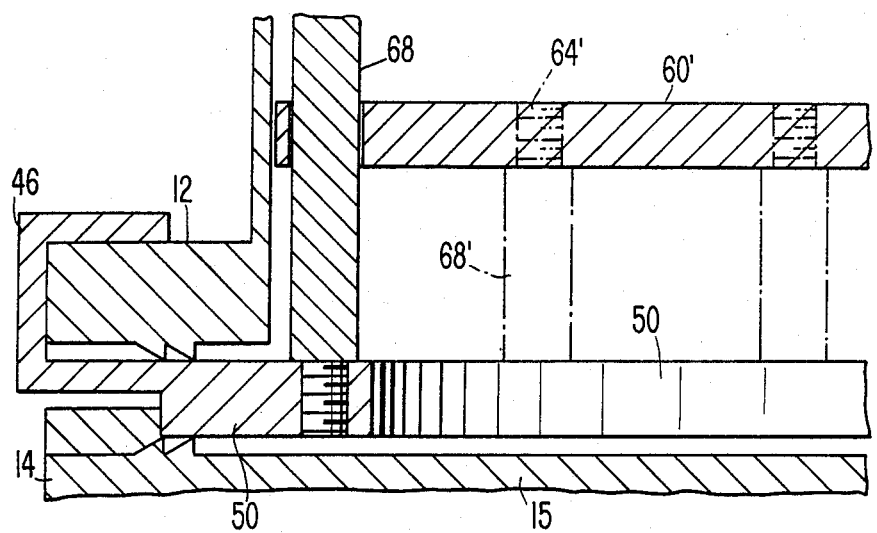
FIG. 7 illustrates a view in cross-section of another embodiment of the gasket according to the present invention in which a series of threaded copper rods and supports are shown in a configuration mated with the gasket.

Other benefits are derived from the present invention. The handles provide a means of inserting the gasket 40 without having to use plastic gloves. Handles 46 are positioned outside the vacuum environment when the apparatus is in an operating position. Thus, oil from the operator's hands will not have an opportunity to smear on the gasket surfaces and contaminate the vacuum chamber. As will be described below and as is shown in FIG. 7, the handles may be wrapped around the back of one of the mating flanges to hold the gasket during the installation procedures, thus preventing the gasket from unintentionally falling to the floor. Similarly, the "clipped" gasket is reliably held in the correct position for sealing and the handles may be used to tug a lodged gasket free from the mating flanges.

Optimum dimensions of the handles and leak check grooves are easily determined. Moreover, the additional cost to manufacture gaskets according to the present invention would be minimal. Gaskets may be stamped from 0.080 in. OFHC copper sheet in a nested pattern. The handles 46 may be comprised of, for example, 0.060 in. o.d. copper wire. The dimensions of the standard leak check groove 48 are typically 0.0625 in. by 0.0625 in. The handles may be attached to the gasket by soldering, or alternatively they may be butt-welded or brazed to the perimeter of the standard ring gasket 30.

Figure 4:
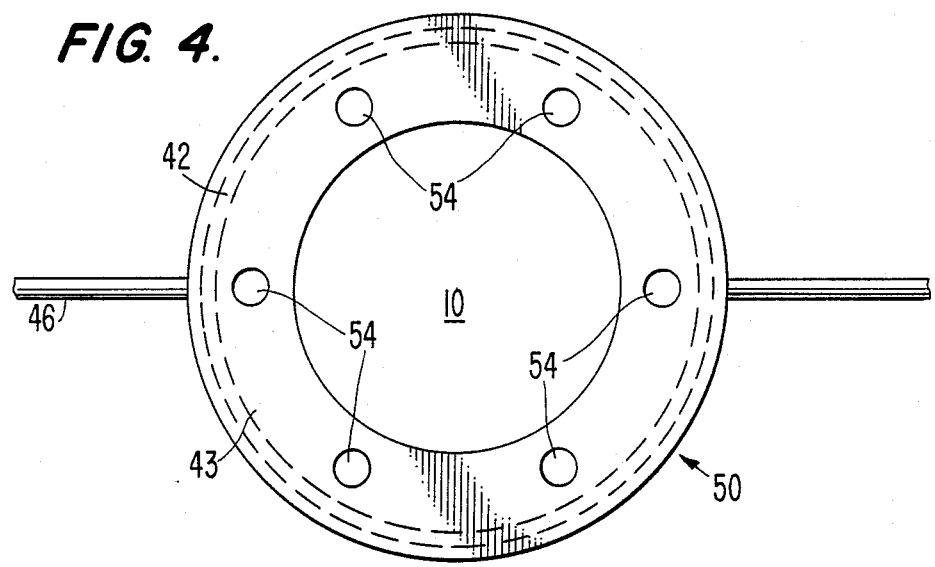
FIG. 4 illustrates a top view of another embodiment of the gasket according to the present invention.
Figure 5:
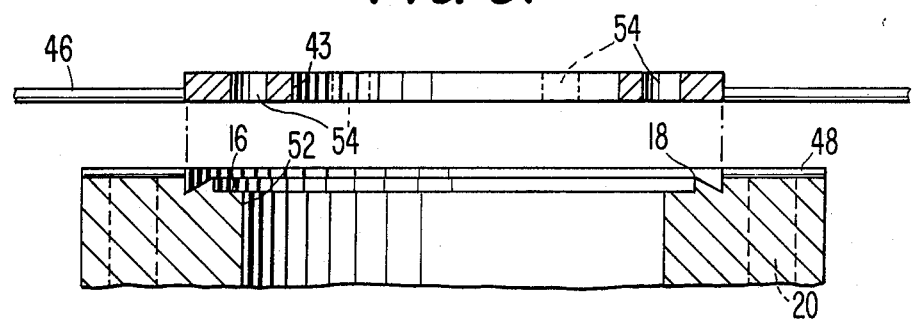
FIG. 5 illustrates an exploded side view of the gasket and bottom flange of the embodiment of FIG. 4 in cross-section.

FIGS. 4 and 5 illustrate another embodiment of the invention in which the annular radial dimension of the gasket 50 is greater than the radial dimension of the gasket 40 shown in FIGS. 2 and 3. The gasket 50 includes a sealing surface 42 but also provides for at least one inner gasket portion 43. Portion 43 has dimensions such that in the operating position of the ultra-high vacuum apparatus, portion 43 eventuates within the confines of flange opening 10 and forms a lip overhanging a flange shoulder 52. Inner gasket portion 43 is ideally wide enough to enable mounting holes 54 to be disposed in portion 43 such that they are completely clear of the flange sealing surface 16 and shoulder 52, as is shown in FIG. 5.

Other embodiments of the gasket are possible, such as portions which extend radially toward the center of the gasket, strips of gasket material extending across the center of the gasket aperture, or even a disk covering the aperture, all these embodiments overhanging flange shoulder 52 and having attachment means such as threaded holes for attaching support structure to the gasket.

Figure 6:
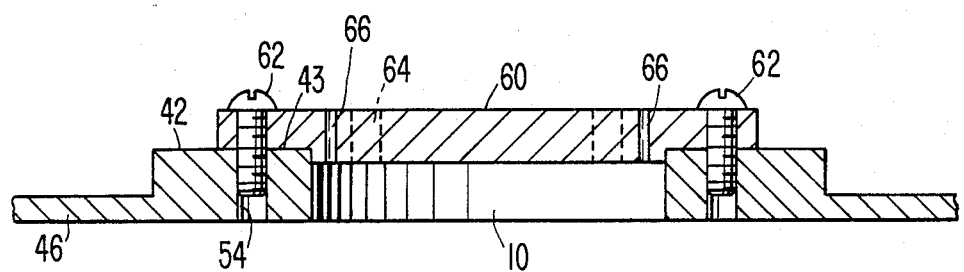
FIG. 6 illustrates a view in cross-section of another embodiment of the gasket in which a circular plate is attached to the gasket.

Mounting holes 54 may be threaded and be capable of receiving various mounting fixtures, such as threaded mounting rods, plates and other supporting fixtures to enable the use of the complete space within the ultra-high vacuum chamber. FIG. 6 shows one such embodiment wherein supporting plate 60 is attached to gasket inner portion 43 by means of screws or bolts 62 screwed into mounting holes 54. Support plate 60 may be a circular disk with an alignment step matching the opening 10 of the CONFLAT gasket 50. Machining operations may be performed on this plate, if necessary, to form desired lands within the vacuum chamber when the disk is in operating use. This machining to be performed without exposing the CONFLAT flange and delicate feed throughs to a machine shop environment.

Support plate 60 includes threaded support rod holes 64, shown in phantom, for mounting of additional support structure (not shown), as necessary. Vent holes 66 are included to allow evacuation of the chamber on both sides of the gasket-support plate assembly. Mounting holes 54 can also be adapted to receive support rods 68, as shown in FIG. 7. Support plate 60' or a support ring (not shown) may be attached to support rods 68 by appropriate means such as slip through tension or pressure fit, and may include threaded holes 64' for screwthreaded attachment of further support structure such as support rods 68', shown in phantom.

FIG. 7 further illustrates an added benefit of the handles 46 which may be bent or wrapped around the flange member 12 to hold the gasket 50 in place and thus afford to the operator the capability for visual and mechanical alignment of the structure inside the vacuum chamber prior to sealing. This is an improvement over the prior art in which the supporting structure is normally mounted on the cover flange, e.g. flange 14.

Generally, there is a need for performing functions within the vacuum chamber during its evacuated operating condition. Such functions may be, for instance, cooling or heating the area immediately surrounding a support structure or other members on which experimentation or processing is being performed so as to simulate conditions in space. As the vacuum chamber is totally evacuated, air convection will not provide a solution to the need for heating or cooling.

On the other hand, conduction through the support structure is possible, especially if the gasket 50 and all supporting elements are manufactured from a thermally conductive metal, such as copper. Heating or cooling the ends of the copper handles 46 will conduct the necessary heat to or remove heat from the support structure and ultimately, through conduction or radiation, to or from the element for which heat transfer is desired. It may be required that the dimensions of the handles 46 and of the leak check groove 48 be accordingly enlarged to provide greater capacity to conduct heat. Heating up to about 450° C. and cooling to −196° C. with liquid nitrogen may thus be achieved using this method.

FIG. 7 further shows flange 14 having a cover portion 15 over opening 10 so as to form one wall of the vacuum chamber. In the prior art, supporting structure or other fixtures are mounted onto holes which were machined into the flange, and which became permanent once a particular flange or chamber wall has been modified. Because space in an ultra-high vacuum chamber is at a premium, modification of a flange frequently spoils that flange for any other function. For instance, if holes are drilled in a flange to provide for cooling fingers, the flange cannot easily be modified to include a feedthrough for an electrical connection without incurring added unnecessary expenses due to the cost of machining stainless steel flanges. It thus becomes much easier to modify a gasket to include means for performing a specialized function, such as cooling. A variety of interchangeable gaskets may thus be used depending on the function required.

Figure 8:
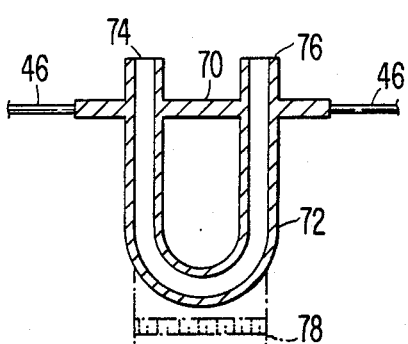
FIG. 8 illustrates a view in cross-section of another embodiment of the gasket in which a through hole is shown through which a fluid may be transported to provide heating or cooling to the vacuum chamber.
Figure 9:
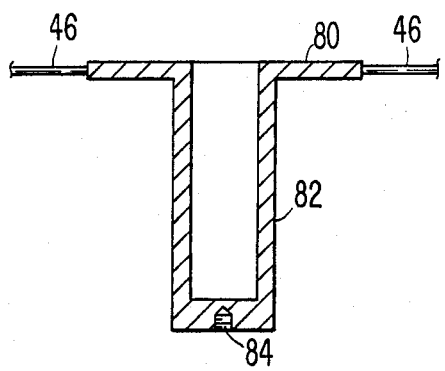
FIG. 9 illustrates another embodiment of the inventive gasket showing a cross-sectional view of a cold finger into which fluid may be inserted for cooling or heating objects in the vacuum chamber.
Figure 10:
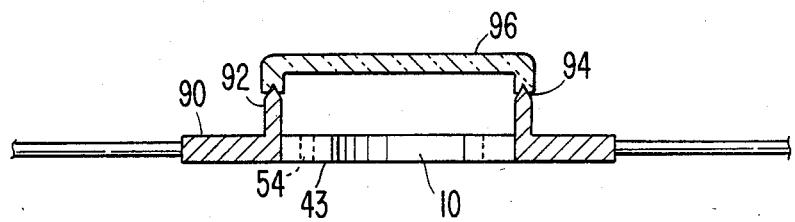
FIG. 10 illustrates another embodiment of the inventive gasket in a cross-sectional view in which a sealing glass allows an operator to observe the inside of the vacuum chamber while it is in operation.

FIGS. 8–10 show a variant structure of the bottom flange 14, where circular opening 10 is replaced by a sealed flange having appropriate members for performing necessary functions within the vacuum chamber.

FIG. 8 illustrates a CONFLAT gasket 70 having feedthrough duct attachment 72 which can be integrally manufactured with the gasket 70. The gasket feedthrough is inserted into a vacuum chamber and a flange (not shown) open to the air at opening 10 can be joined to the upper flange for complete sealing of the vacuum chamber. Since the gasket 70 and duct attachment 72 are airtight and hermetically sealed across their common boundary, the duct attachment may be open or vented to the atmosphere and may perform the function of the re-entrant cold trap of a flowthrough heat exchanger. Liquid nitrogen or other fluid having an appropriate temperature may be injected into one duct end 74 and extracted from the other duct end 76 in a continuous stream. The liquid nitrogen would thus cool duct attachment 72 and optional support structure 78, shown in phantom, attached to duct attachment 72.

Alternatively, as shown in FIG. 9, gasket 80 may have an integral cooling finger 82 disposed integrally therewith. Liquid nitrogen or other appropriate fluid having a desired temperature may be inserted into cooling finger 82 which would cool the finger and the optional support structure (not shown) connected to threaded support rod mounting hole 84.

FIG. 10 shows another embodiment of a gasket structure 90 having means 92 for creating a seal 94 with a glass cover optical window 96, which may comprise a housekeeper glass seal and which can withstand pressures of over one atmosphere. Such an optical window 96 would be particularly useful for experiments where it is necessary to observe the progress of events within the vacuum chamber. Optionally, gasket 90 may have an inner gasket portion 43 with holes 53 for supporting structure attachment, where opening 10 would allow for observation within the vacuum chamber as necessary.

Other embodiments of feedthrough attachments as well as combinations of the various features discussed above will become apparent from an understanding of this invention.

Although the present invention has been discussed and described with primary emphasis on the preferred embodiments, it should be understood that various modifications can be made in the design and operation of the present invention without departing from the spirit and scope thereof. The present embodiment and method are therefore to be considered in all respects as illustrative and not restrictive, the scope of the invention being indicated by the following claims rather than by the foregoing description, and all changes which come within the meaning and range of equivalency of the claims are therefore to be embraced therein.

What is claimed is:

1. A gasket seal having an operating position for use in an ultra-high vacuum apparatus comprising:
   (a) substantially rigid first and second flange members, each having a generally annular sealing surface, said sealing surface of said first flange member being disposed opposite from and facing said sealing surface of said second flange member and being complementary to said first flange member when the gasket seal is in the operating position; and
   (b) a substantially annular gasket for insertion between said flange member sealing surfaces when the gasket seal is in the operating position, said gasket including integral handling means for inserting said gasket in and for removing said gasket from said flange member sealing surfaces, whereby said handling means do not engage said flange member sealing surfaces when said gasket seal is in the operating position, and whereby said flange member sealing surfaces compress said gasket to form an hermetic seal when the gasket seal is in the operating position.

2. The gasket seal according to claim 1 wherein at least one of said flange members further comprise at least one leak check groove at the periphery of said at least one flange member through which said handling means extend.

3. The gasket seal according to claim 2 wherein said handling means further comprise at least one wire fixedly attached to said gasket member and having a transverse dimension substantially equal to a transverse dimension of said leak check groove.

4. The gasket seal according to claim 1 wherein said gasket and said handling means are both bakeable and comprise a soft metal.

5. The gasket seal according to claim 4 wherein said gasket and said handling means further comprise copper.

6. The gasket seal according to claim 4 wherein said gasket and said handling means further comprise aluminum.

7. The gasket seal according to claim 1 wherein said gasket handling means comprise a thermally conductive material enabling the function of a thermal conduit for transfer of heat through a wall defining said ultra-high vacuum apparatus.

8. The gasket seal according to claim 1 wherein said gasket further comprises portions extending inwardly from each of the flange member sealing surfaces and said portions include mounting holes extending transversely through a longitudinal dimension of said gasket portions when said gasket seal is in the operating position, said mounting holes being adapted for receiving and mounting a support structure.

9. The gasket seal according to claim 1 wherein said gasket further comprises feedthrough means to perform functions within the ultra-high vacuum apparatus when it is in its operating position without interrupting the evacuated condition of the ultra-high vacuum apparatus.

10. The gasket seal according to claim 9 wherein said feedthrough means comprise a duct being vented to the atmosphere for injecting a fluid into a space within a wall defining the ultra-high vacuum apparatus, said duct being hermetically sealed from the vacuum apparatus.

11. The gasket seal according to claim 9 wherein said feedthrough means comprise a cooling finger for receiving a fluid whereby materials placed within a wall defining said ultra-high vacuum apparatus can undergo heat transfer through said cooling finger.

12. The gasket seal according to claim 9 wherein said feedthrough means comprise an optional window for observation within the ultra-high vacuum apparatus when it is in the operating position.

13. A bakeable gasket for insertion between flanges of an ultra-high vacuum device, the flanges each having at least one sealing surface, comprising:
   (a) a generally annular gasket portion substantially traversing the shape of an O-ring; and
   (b) integral handling means attached to said annular portion for inserting said gasket in and for removing said gasket from the flange sealing surfaces, whereby said handling means are adapted to be disposed outside the flange sealing surfaces and said ultra-high vacuum device after insertion and further adapted to avoid impairment of the sealing properties of the ultra-high vacuum device.

14. The bakeable gasket according to claim 13 wherein said annular gasket portion further comprises segments extending within the ultra-high vacuum device and being adapted for receiving supporting structures.

15. The bakeable gasket according to claim 13 wherein said annular portion has a radial dimension greater than a radial dimension of the flange sealing surfaces so that the inner radius of the annular gasket is adapted to be substantially inside an inner radius of the flange sealing surfaces after gasket insertion, whereby mounting holes for mounting a support structure may be included in said annular gasket adjacent said inner radius of said flange sealing surfaces.

16. The bakeable gasket according to claim 15 wherein said handling means comprises at least one wire comprise a soft metal.

17. The bakeable gasket according to claim 16 wherein said annular gasket portion and said at least one wire comprise aluminum.

18. The bakeable gasket according to claim 17 wherein said feedthrough means comprises an hermetically sealed duct adapted to received in a confined space immediately adjacent the ultra-high vacuum device a fluid which can facilitate heat transfer.

19. The bakeable gasket according to claim 17 wherein said feedthrough means comprises at least one cooling finger for receiving and holding a fluid whereby heat transfer across the gasket boundary is facilitated.

20. The bakeable gasket according to claim 17 wherein said feedthrough means comprise an optical window for observation through the gasket boundary and into the ultra-high vacuum device.

21. The bakeable gasket according to claim 13 wherein said handling means comprises at least one wire fixedly attached to said gasket member at its outside periphery.

22. The bakeable gasket according to claim 21 wherein said annular gasket portion and said at least one wire comprise copper.

23. The bakeable gasket according to claim 13 further comprising feedthrough means adapted to allow the performance of functions within the ultra-high vacuum device when it is in an evacuated condition.

24. A gasket seal having an operating position for use in an ultra-high vacuum apparatus comprising:
(a) substantially rigid first and second flange members, each having a sealing surface, said sealing surface of said first flange member being disposed opposite from and facing said sealing surface of said second flange member and being complementary to said first flange member when the gasket seal is in the operating position; and
(b) a gasket for insertion between said flange member sealing surfaces when the gasket seal is in the operating position, said gasket including integral handling means for inserting said gasket in and for removing said gasket from said flange member sealing surfaces,
wherein said first flange member, said second flange member, and said handling means are so constructed and arranged that said handling means does not engage said first and said second flange member sealing surfaces when said gasket seal is in the operating position, and whereby said first and said second flange member sealing surfaces compress said gasket to form an hermetic seal when the gasket seal is in the operating position.

* * * * *